(12) United States Patent
Royal et al.

(10) Patent No.: US 7,489,324 B2
(45) Date of Patent: Feb. 10, 2009

(54) AUTOMATED IMAGE PROCESSING

(75) Inventors: Eliza H. Royal, Lincoln, MA (US);
Brian D. Hanechak, Waltham, MA (US); Robert L. Dulaney, Paxton, MA (US)

(73) Assignee: Vistaprint Technologies Limited, Hamilton (BM)

( * ) Notice: Subject to any disclaimer, the term of this patent is extended or adjusted under 35 U.S.C. 154(b) by 390 days.

(21) Appl. No.: 11/073,962

(22) Filed: Mar. 7, 2005

(65) Prior Publication Data

US 2006/0197963 A1 Sep. 7, 2006

(51) Int. Cl.
*G09G 5/00* (2006.01)
(52) U.S. Cl. .................. 345/667; 345/620; 715/800
(58) Field of Classification Search .......... 345/667
See application file for complete search history.

(56) References Cited

U.S. PATENT DOCUMENTS

| | | | |
|---|---|---|---|
| 5,930,811 A | 7/1999 | Nojima et al. | |
| 6,281,874 B1 * | 8/2001 | Sivan et al. | 345/660 |
| 6,583,799 B1 * | 6/2003 | Manolis et al. | 715/838 |
| 6,826,727 B1 * | 11/2004 | Mohr et al. | 715/517 |
| 6,906,730 B2 * | 6/2005 | Bossut et al. | 345/629 |
| 7,246,147 B2 * | 7/2007 | Kim et al. | 709/203 |
| 7,281,048 B2 * | 10/2007 | Watanabe | 709/229 |
| 2002/0025085 A1 | 2/2002 | Gustafson et al. | |
| 2002/0180764 A1 * | 12/2002 | Gilbert et al. | 345/660 |
| 2003/0058457 A1 * | 3/2003 | Fredlund et al. | 358/1.2 |
| 2003/0137545 A1 * | 7/2003 | Hoehn et al. | 345/838 |
| 2004/0148573 A1 * | 7/2004 | Buice et al. | 715/517 |
| 2004/0160624 A1 * | 8/2004 | Elgar et al. | 358/1.15 |
| 2004/0250205 A1 * | 12/2004 | Conning | 715/517 |
| 2004/0252340 A1 * | 12/2004 | Komagamine et al. | 358/1.18 |
| 2005/0007382 A1 | 1/2005 | Schowtka | |
| 2005/0055636 A1 * | 3/2005 | Graves | 715/526 |
| 2005/0114784 A1 * | 5/2005 | Spring et al. | 715/762 |
| 2006/0132836 A1 * | 6/2006 | Coyne | 358/1.15 |
| 2006/0190811 A1 * | 8/2006 | Ohno | 715/507 |

* cited by examiner

*Primary Examiner*—M Good Johnson
(74) *Attorney, Agent, or Firm*—Robert L. Dulaney; Jessica J. Costa (57) ABSTRACT

Automated electronic document design systems and methods for appropriately sizing and positioning uploaded user images into predefined image areas in a product design being created in a Web environment. For an image that is not to be cropped when incorporated into the design, the image is sized to fit within the selected image area and positioned in the image area according to a predefined anchor location. The aspect ratio of the original image is maintained. For an image that is available for cropping when incorporated into the design, the image is sized and cropped to create a version of the image that fills the image container.

20 Claims, 8 Drawing Sheets

AUTOMATED IMAGE PROCESSING

FIELD OF THE INVENTION

The present invention relates to computer-implemented automated product design.

BACKGROUND OF THE INVENTION

Web-based printing service providers typically provide their customers with the ability to access the service provider's web site, view product templates provided by the service provider, and enter information to create a customized markup language document. For customers who are unable or unwilling to complete a custom product design online without assistance, some service providers provide their customers with access to service representatives who will give advice to the customer or perform some or all of the product design for the customer.

In creating a customized product, many customers desire to incorporate a personal photograph, company logo, or other custom image content into the product design. To support and facilitate this, web-based printing service providers typically provide tools allowing customers to readily upload images to the service provider's web site servers for use by the customer or by the service provider's design representative in creating the customer's product design. After an image has been uploaded, however, the subsequent process of properly sizing and positioning the image into the custom design is generally relatively slow and cumbersome. In many cases, the customer's image is initially simply dropped by the system in a default location relative to the design being prepared and at a default size relative to the rest of the elements of the product design and must then be manually resized and/or repositioned to a desired size and location in the design. In addition to requiring various manual steps to prepare the image, some image sizing and positioning steps fail to take precautions to prevent the accidental introduction of errors into the customer's image, such as an undesired distortion or cropping of a photograph or company logo.

There is, therefore, a need for a novel and flexible system that facilitates the rapid incorporation of images into custom electronic product designs while reducing the incidence of inadvertent and undesirable changes to the image during the incorporation process.

SUMMARY

The present invention is directed to satisfying the need for systems and methods that increase the speed, reliability, and ease of incorporating images into custom product designs.

In accordance with one aspect of the invention, a product design having one or more image containers intended to receive customer images that are not available to be cropped is displayed to a user. A version of an image selected by the user for incorporation into the design is created automatically by resizing the selected image without cropping and positioning the image version within the image container.

In accordance with another aspect of the invention, a product design having one or more image containers intended to receive customer images that may or may not be available to be cropped is displayed to a user. A version of an image selected by the user for incorporation into the product design is either automatically resized without cropping or resized and cropped, as determined by user input when the image was selected. The resulting version of the selected image is automatically positioned within the image container.

In accordance with yet another aspect of the invention, a product design having one or more image containers intended to receive customer images that may or may not be available to be cropped is displayed to a user. Images are retained with an associated indicator of image type. A version of an image selected by the user for incorporation into the image design is either automatically resized without cropping or resized and cropped, as determined by the associated image type of the selected image. The resulting version of the selected image is automatically positioned within the image container.

It is an advantage that the risk of the inadvertent introduction of errors into a customer image is reduced.

These and other objects, features and advantages of the invention will be better understood with reference to the accompanying drawings, description and claims.

DETAILED DESCRIPTION

Figure 1:
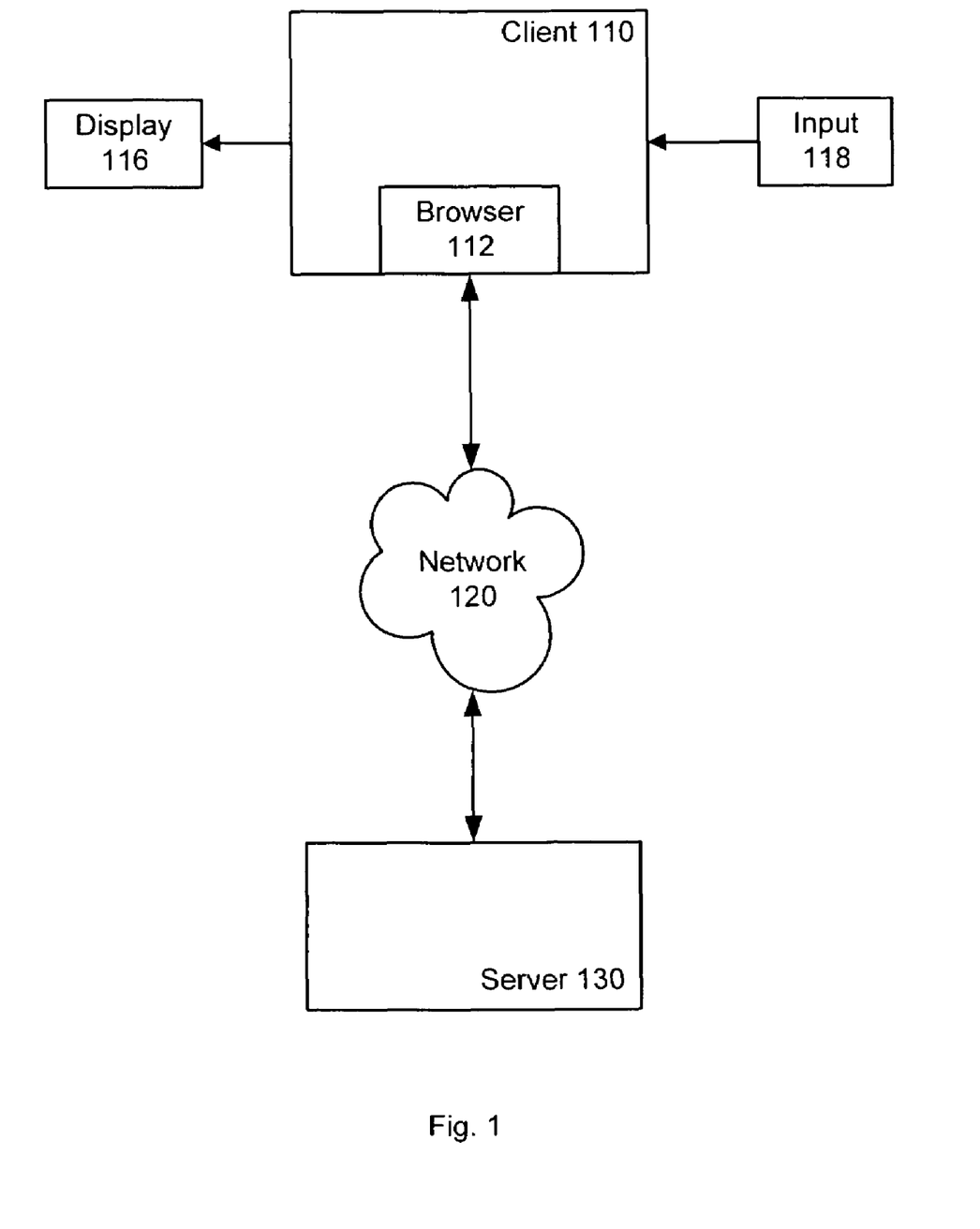
FIG. 1 is a block diagram of a networked system with which the invention may be employed.

Referring to FIG. 1, client system 10 is a typically equipped personal computer, portable computer, or other system capable of communicating via network 120 with the remote server system of an online product design services provider, such as server 130, and capable of executing a web browser program 112. The client 110 system also includes a user display 116 capable of displaying text, images, and graphics to a user of the system and one or more user data input devices 118, such as a keyboard and a mouse. The user of client 110 could be a customer accessing server 130 from the customer's home, business, or other location or the user of client 110 could be a service representative employed by the service provider to prepare product designs on behalf of a customer and accessing server 130 from a service provider facility or other location.

Server 130 is the web site computing and support system of a provider of online custom product design services. In the following discussion, a site that allows users of the site to design and purchase personalized printed products using online software tools available at the site, such as VistaPrint.com operated by VistaPrint Limited, will be discussed, but it will be understood that the invention is not so limited. While server 130 is depicted in FIG. 1 as a single block, it will be understood that server 130 will typically be comprised of multiple servers, data storage systems, and other equipment and devices configured to communicate and operate cooperatively to support the operations of the site.

Figure 2:
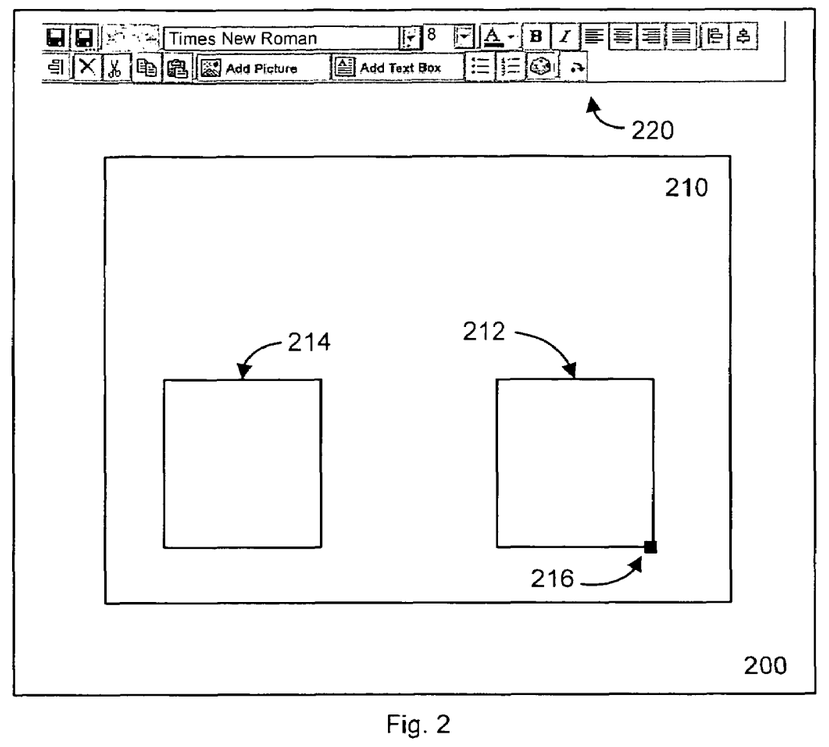
FIG. 2 is a representation of an online product design display available for viewing by a user during the creation of an electronic document.

FIG. 2 is a simplified representation of a product edit screen 200 displayed to a user designing a custom product using the design tools provided by server 130. The display includes product design image 210, showing the user the current state of the design being created by the user, and tool bar 220 for allowing the user to insert text, select fonts and font attributes, and perform other well-known and understood functions and operations.

Upon initiating a product design project, the user would typically have reviewed and interacted with various preliminary Web pages, not shown. A typical representative user would initially review the service provider's product offerings, select a particular type of product design to be created, review the candidate product design templates presented by the service provider, and select a particular design template that contains a combination of design features, such as graphics, shapes, paper effects, colors, and/or background images, that the user finds appealing. Templates are retained at the server 130 as markup language, such as XML, descriptions specifying the size, position, content, z-index, and other attributes of the product design text containers, image containers, graphics, and other design elements, such that the product design can be communicated to and rendered at client 110 by client browser 112 for display to the user.

The design template selected by the user is then displayed on design screen 200 as product design 210 and serves as the starting point to which the user will add the user's text, images or other desired content to create a personalized design. For simplicity of presentation of the invention described herein, no design elements other than image containers 212 and 214 are shown in design 210.

In concept, images provided by a user for use in a design can be grouped into two basic categories: images that the user will allow to be cropped such that only a portion of the provided image is used in the design and images that the user does not wish to be cropped, such as a company logo or a photo that the user wants to ensure is used in an uncropped form. The embodiments described below disclose techniques for handling these different types of images.

Two image containers are shown in FIG. 2 for the purpose of discussing two different image incorporation techniques, but it will be understood that the particular number of image containers, as well as their size and position, in a design is not relevant. Image containers need not be separated. An image container could abut, overlap, or be placed on top of another container. In addition, the particular type of product being prepared is not relevant to the application of the invention. The product could be, for example, a business card, postcard, brochure, poster, label, item of clothing, promotional product, or any other type of product that lends itself to the use of online electronic design systems. Further, it is not necessary that the design being created be a complete product. The invention could be employed to create a component element suitable for subsequent incorporation into a larger product design.

In the first embodiment discussed below, at the time the product design template is created by the service provider, each image container capable of receiving a user image is tagged as either being a cropping container or a non-cropping container. Non-cropping containers, such as 212, include a specification of an anchor point for that container. The lower right corner of image container 212 has been established by the service provider as anchor point 216. As will be discussed below, in many cases the size of the image will not correspond to the size of the image container. The anchor point of an image container is used by the system to control the positioning of the image relative to the container.

Figure 3:
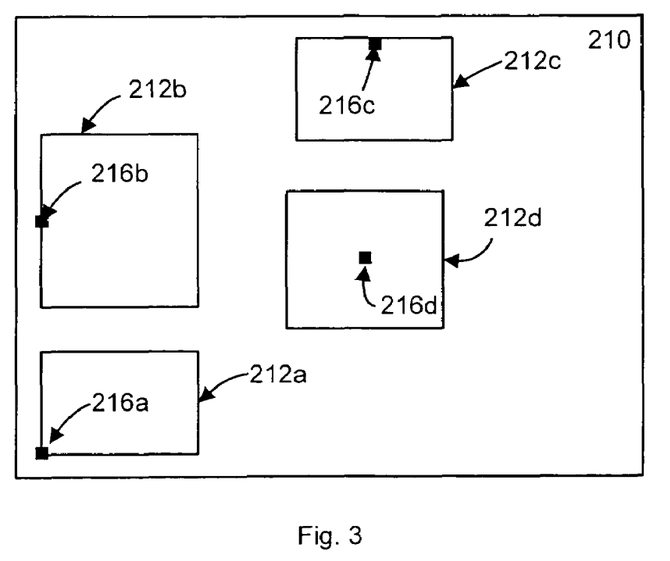
FIG. 3 shows representative examples of possible locations of image areas in product design 210.

At the time the general layout of the design template is being prepared, the anchor points are specified by the service provider based on aesthetic considerations related to the general location of the image container within product design 210. Referring to FIG. 3, illustrative alternate image container locations 212a-212d and associated anchor points 216a-216d are illustrated. In the disclosed embodiment, nine possible anchor locations are employed: the four corner of the container, such as anchor point 216a, the midpoints of the four sides of the container, such as anchor points 216b and 216c, and the container center, such as anchor point 216d. More or fewer possible anchor points could be employed in other embodiments.

Figure 4A:
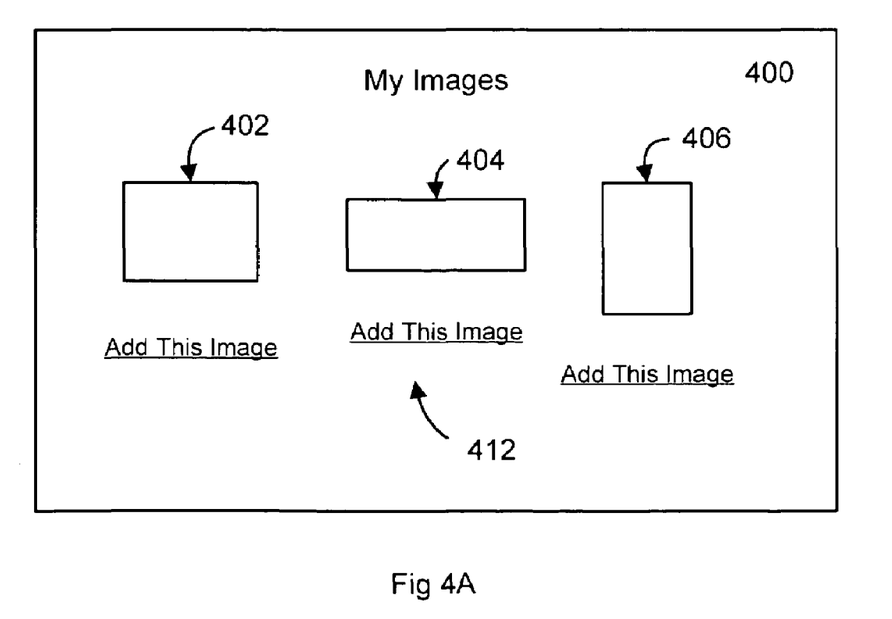
FIGS. 4A-4C depict alternate embodiments of user image selection screen 400.

In the disclosed embodiment, the user will first select the desired image container and then select a desired image for placement at that container location. When the user desires to incorporate an image into design 210, the user initiates the image addition process by moving the display cursor over the image area where the user desires to place the image and double clicking. Buttons or other techniques or tools could also be employed to start the process. Upon the user's selection of one of the image containers, an image selection screen will be displayed. Alternatively, the user could select the desired image first and then identify the desired container for the image FIG. 4A shows an embodiment of image selection screen 400 for use in a system wherein the manner of processing images for incorporation into design 210 is determined by the type of image container selected by the user to receive the image. Image selection screen 400 displays representations of images 402, 404 and 406. These three thumbnail images were created by server 130 from the original images previously uploaded to server 130 from client 110 or another system and associated with this user. Associated with each image is an Add This Image link 412 notifying server 130 that the associated image is to be incorporated into design 210 in the selected image container.

Figure 5A:
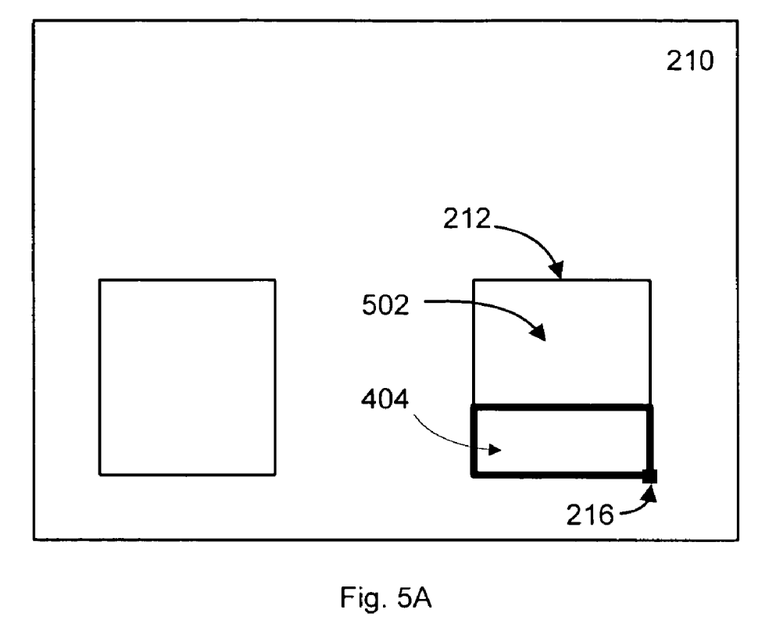
FIGS. 5A-5D are representations of embodiments for the incorporation of an uncropped image into product design 100.

For example, if the user indicates a desire to incorporate an image into container 212 and, upon reviewing image selection screen 400, the user selects link 412 associated with image 404, server 130 will retrieve the stored version of image 404 and resize the image as necessary to make the resized image fit the selected container while maintaining the original images ratio of width to height, referred to herein as the aspect ratio. In other words, the selected image is resized at a fixed aspect ratio such that one dimension of the resized version is equal to the corresponding dimension of container 212 and the other dimension of the resized image is equal to or less than the corresponding other dimension of container 212, as represented in FIG. 5A by the resized version of image 404 shown in bold lines.

It is possible that a stored image will have exactly the same aspect ratio as the image container, but that will not typically be the situation. In most cases, the resizing operation of the image will result in a portion 502 of the image container being "empty". The display attributes of this portion of the container are set appropriately to make portion 502 transparent, allowing the background or other design elements located beneath container 212 to be visible.

The resized image 404 is positioned within container 212 as dictated by the location of anchor 216. In the example shown in FIG. 5A, anchor 216 is located at the lower right corner of container 212, therefore the lower right corner of resized image 404 is anchored at this point.

For a product design that is intended to ultimately be printed on paper or other material using a high quality printing system, the printing service provider will typically require that all images in the design have at least a minimum resolution to ensure that the printed version of the image is of appropriate quality. For example, for images that will be printed on a high quality CMYK offset printing system, images are typically processed at an image resolution of approximately 300 dots per inch. Slightly lower image resolutions will still produce printed products of acceptable quality, but an image resolution of less that 225 dots per inch will generally compromise the quality of the printed product. For this reason, some service providers check the print resolution of incorporated images and provide an alert indication to the user if an image sized to fit a particular image container will result in excessively low resolution.

Figure 5B:
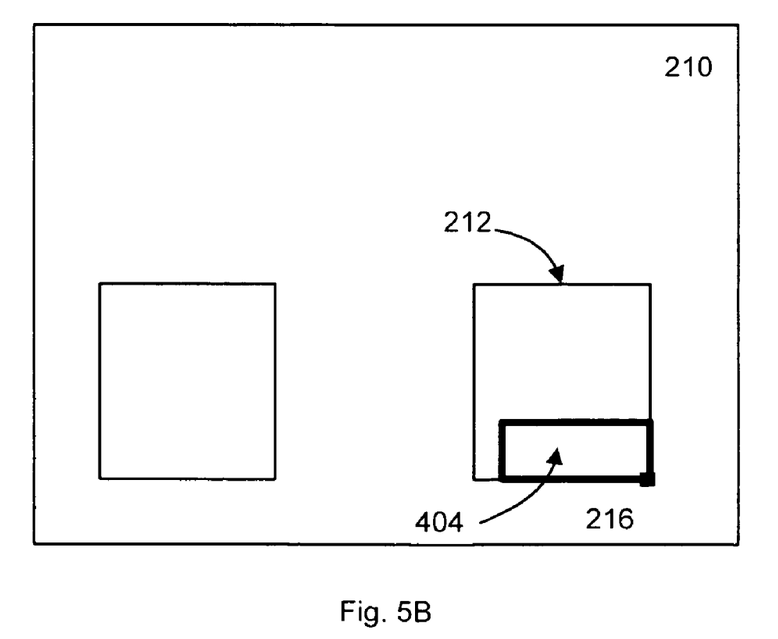

In the disclosed embodiment, after image 404 has been resized appropriately to fit in image container 212 of design 210 and prior to displaying updated design 210 to the user, resized image 404 is checked to verify that it meets the minimum resolution level established by the service provider. If resized image 404 meets the resolution requirement, the user will see design 210 as shown in FIG. 5A. However, if resized image 404 fails to have the minimum resolution, server 130 reduces the size of image 404 relative to container 212, while still maintaining the aspect ratio of the original stored image 404, to reach the point where image 404 meets the minimum print requirement. This reduced size version of image 404 is placed in container 212 and the user will see design 210 as indicated in FIG. 5B. Anchor 216 still controls the positioning of the image 404 within container 212. In this manner, based on the user's selection of a desired image, the selected image is both automatically sized to fit the designated container and automatically appropriately positioned in the designated container without any further effort by the user.

In the embodiment described in connection with FIGS. 5A and 5B, resized image 404 is made the image content of container 212. As an alternate embodiment, referring to FIG. 5C, instead of applying image 404 as image content for container 212, container 212 is employed only as an initial sizing and positioning indicator. The resizing and positioning of image 404 within design 210 is accomplished based on container 212 as described above, but container 212 is then made transparent and the resized image 404 is placed in a new image container 504 that is displayed over container 212.

Figure 5C:
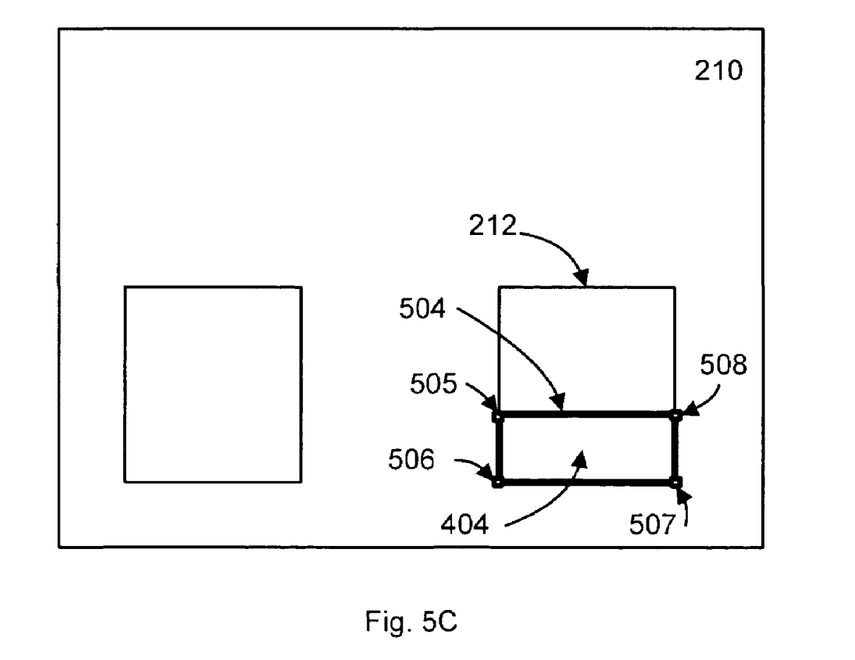
Figure 5D:
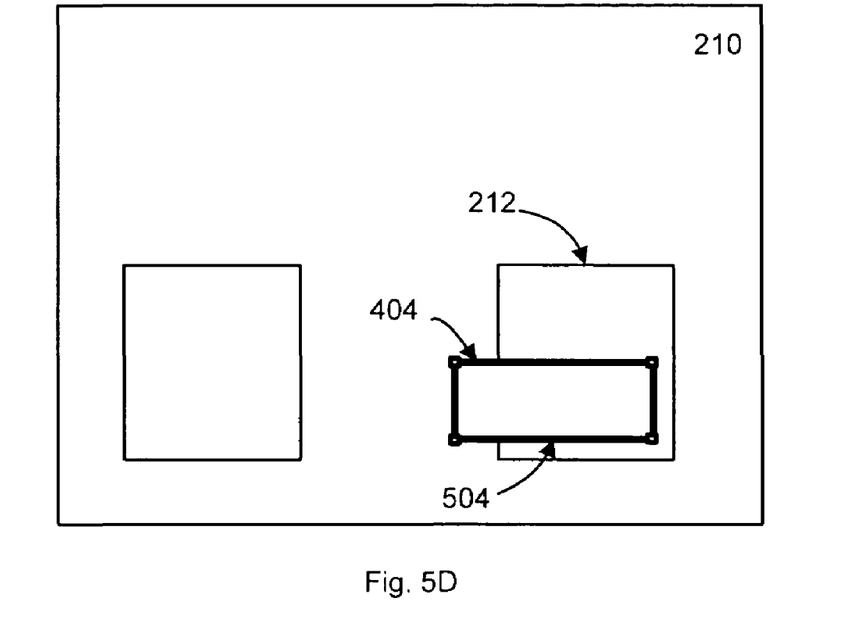

The user can either leave image 404 in the initial position as shown in FIG. 5C or can resize or reposition image container 504 using conventional click-and-drag techniques. Container 504 can be made larger or smaller using one of the four corner handles 505-508. This allows the user to quickly make adjustments to the image position or size, if desired. For example, the user could, if desired, manually manipulate image 404 to a size and position as shown in FIG. 5D. To avoid the introduction of inadvertent distortions into the image during a modification process, container 504 is configured to have a locked aspect ratio so that the user cannot accidentally deviate from the aspect ratio of the original stored image.

For some user images, cropping may be possible or even desirable. The user may expressly desire to use only a particular portion of an image. Also, just as the service provider may have created templates with particular locations for the insertion of images that are not to be cropped, such as a logo or certain photographs, the service provider may also have created templates containing one or more image containers that are intended to be completely filled with image content. Because complete filling of the container is a requirement of these containers, any image selected for these containers must permit resizing and cropping to produce a version of the image that corresponds to the size and dimensions of the container. This type of container is represented in FIG. 2 as container 214.

Figure 6A:
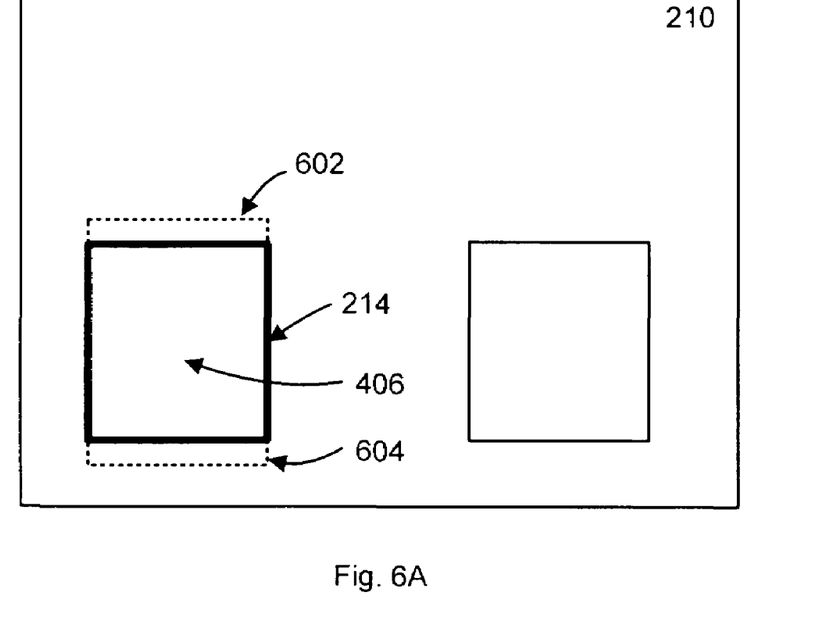
FIGS. 6A and 6B illustrate alternate embodiments for incorporating a cropped image into product design 100.

This type of image container could be implemented in various known ways. For example, one image cropping technique is depicted in FIG. 6A. The user indicates a desire to place an image in container 214, for example by double clicking on the container 214 image in design 210. In response, image selection screen 400 is presented to the user. If the user then selects the Add This Image link 412 associated with thumbnail image 406, server 130 retrieves the stored image 406 and resizes the image such that it completely fills container 214. Unless the selected image happens to have exactly the same aspect ratio as selected container 214, the resizing will conceptually result in a portion of the selected image extending outside the border of the container. This "excess" portion of image 406 is indicated in FIG. 6A by areas 602 and 604, is cropped. The cropped version of image 406 is then displayed to the user in container 214 in design 210. This approach quickly displays a revised design 210 to the user, but the cropped version selected may not be the exact version of the image desired by the user.

As mentioned above, an image with insufficient resolution will typically not produce acceptable high quality printed products. The cropped version of the image is, therefore, checked to determine if it meets the minimum resolution requirement of the service provider. In the disclosed embodiment, some users may still wish to continue with the design even though the image they have selected may not have the level of resolution desired by the service provider. Therefore, the image version is displayed to the user in design 210 even if the resolution is determined to be less than the minimum requirement for high quality printing, but, to ensure that the user is alerted to the situation, a warning message is displayed and the image version is displayed with a color tint.

Figure 6B:
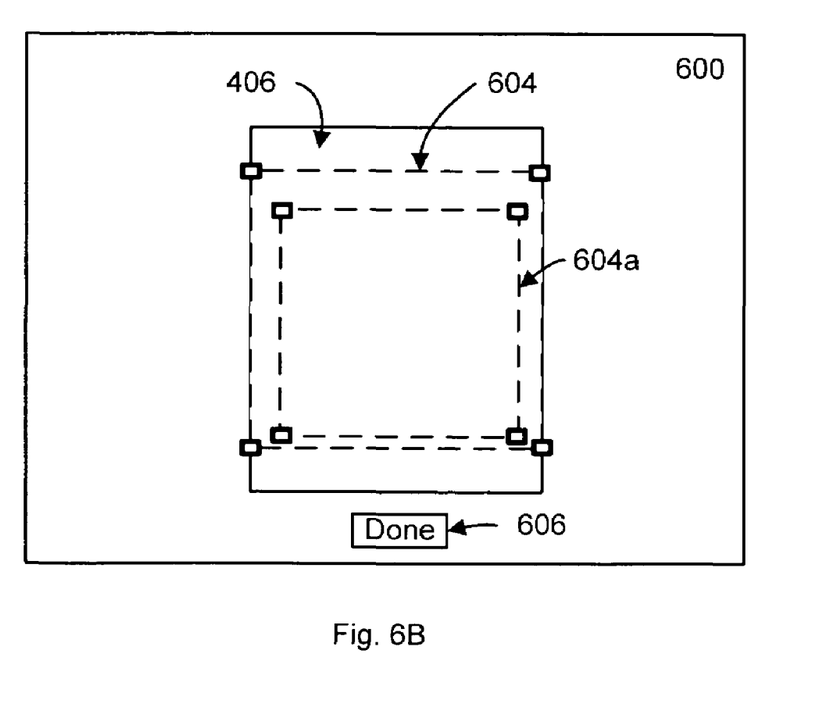

Alternatively, upon user selection of image 406 on image screen 400, the user could be provided first with cropping screen 600, allowing the user to select the particular portion of image 406 that will be used in design 210. Crop box 604, having a locked aspect ratio corresponding to the aspect ratio of container 214, is presented to the user along with image 406. The user can resize and reposition the crop box relative to image 406 to select the desired crop area, indicated by new crop box position 604a. When the desired area is within the crop box, the user selects Done button 406, which causes design 210 to be updated to reflect the selected portion of image 406 in container 214. The cropped version of the image selected by the user can be checked for minimum resolution while the user is viewing screen 600.

Figure 4B:
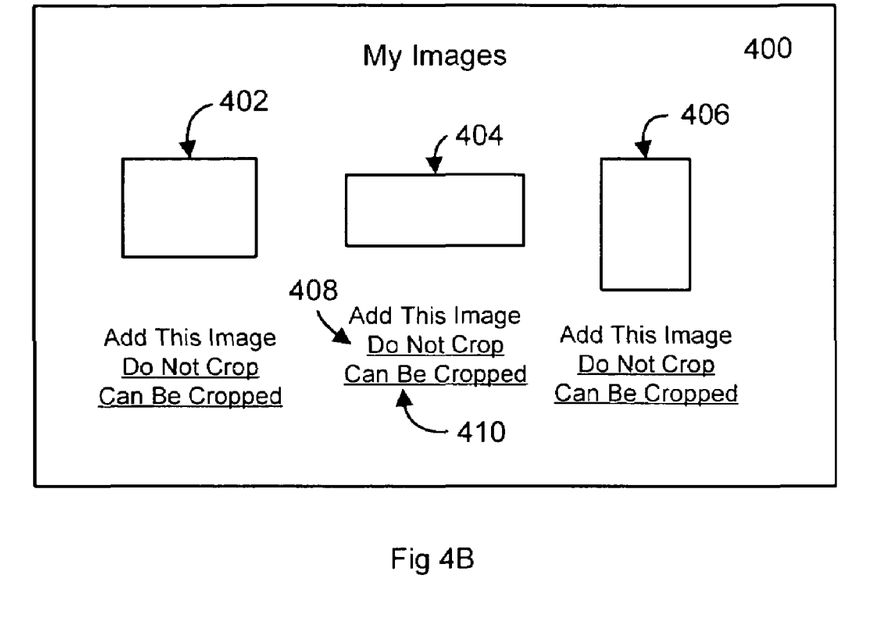

In the above-described embodiment, the processing of selected images is determined by the type of image container where the image is to be placed. Referring now to FIG. 4B, an alternate embodiment of image selection screen 400 is shown wherein the manner of processing images for incorporation into design 210 is determined by the image processing option chosen by the user. Each of the thumbnail representations of images 402, 404 and 406 has two associated user-selectable links that serve to control the manner in which the image will be incorporated into the selected image container. Do Not Crop link 408 informs server 130 that the associated image should be resized so as to appear in the design in an uncropped manner. Can Be Cropped link 410 informs server 130 that the image may be resized and cropped as necessary to created a version of the selected image that is the completely fills the container area. Because any of the containers provided in design 210 for receiving a user image could receive either a croppable or an uncroppable image, all containers would be assigned an anchor location for use if needed.

Figure 4C:
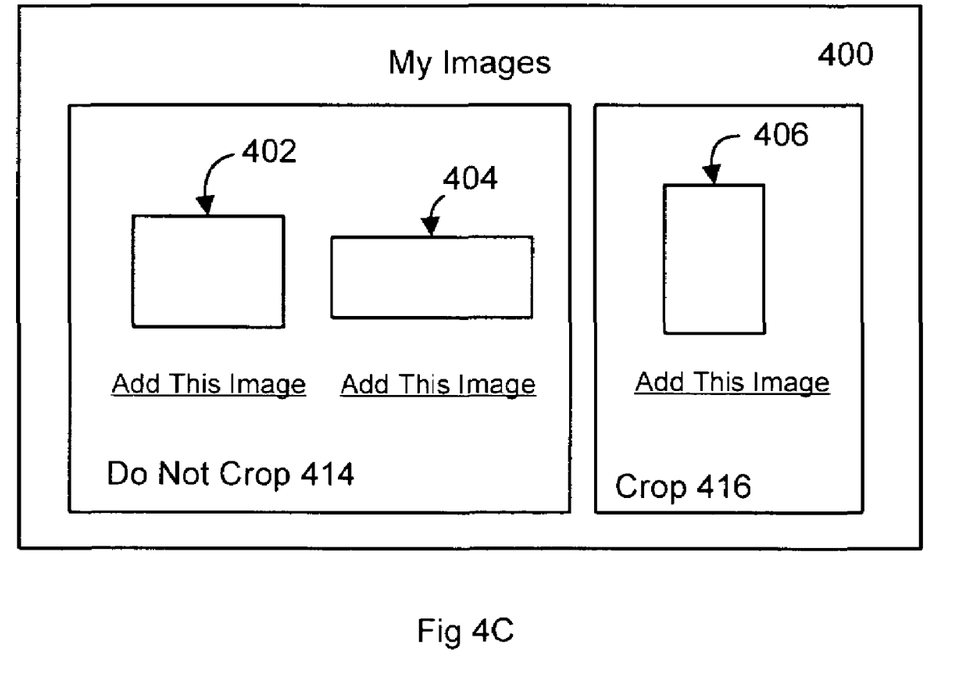

Various other embodiments of image selection screen 400 could be readily employed, if considered desirable. For example, referring to FIG. 4C, the customer's images could have been earlier placed by the user into predetermined categories, such as Do Not Crop 414 for images that the customer does not want cropped and Crop 416 for images that the customer will allow to be cropped. A selected image would be processed for incorporation into design 210 in accordance with the image's associated category.

Figure 7:
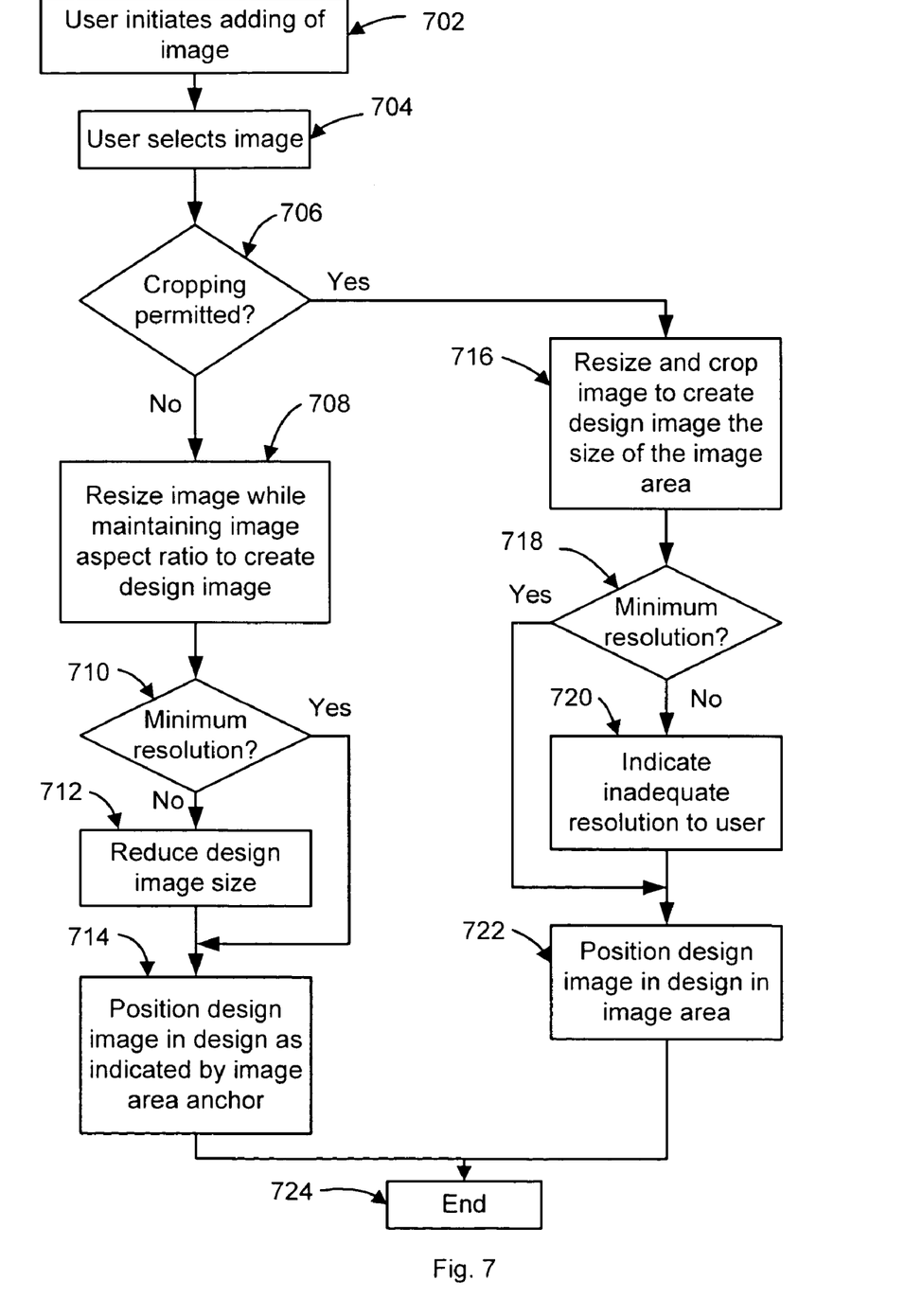
FIG. 7 is a flowchart of an image incorporation method.

Referring now to FIG. 7, a representative method for employing the invention disclosed herein will be reviewed. At step 702, the user initiates the process of adding a user image to a design. At step 704, the user selects the desired image from image selection screen 400. At step 706, the manner in which the selected image will be processed for incorporation into the design is determined. If cropping of the image is not permitted, at step 708 the selected image is resized such that one dimension of the resized image is equal to the corresponding dimension of the image container while the other dimension of the resized image is equal to or less than the corresponding other dimension of the image container. The aspect ratio of the original selected image is maintained in the resized version of the image. If this resized image meets the minimum resolution requirement of the service provider at step 710, the resized image is positioned in the design at step 714 as indicated by the location of the image anchor. If the resized image does not meet the minimum resolution requirement at step 710, the image size is reduced at step 712 so as to meet the resolution requirement prior to incorporation into the design at step 714.

If cropping of the image is permitted at step 706, a version of the selected image is created that is of sufficient size to fill the selected image container. The creation of this image version could be done with user participation, such as by providing a manual crop box, or could be done automatically by the system. If the version of the image does not meet the minimum resolution requirement at step 718, the inadequate resolution condition is visually indicated to the user at step 720. At step 722, the image version is positioned in the design at the location of the image container and displayed to the user.

While the invention has been described in various exemplary embodiments, the described embodiments are to be considered as illustrative rather than restrictive. The scope of the invention, therefore, is as indicated in the following claims and all equivalent methods and systems.

It is an advantage of the invention that the incorporation of customer images into a custom design is facilitated.

What is claimed is:

1. A computer-implemented method for incorporating an uploaded image into a product design, the method comprising:
   using one or more computing systems to perform the following steps:
   providing a product design for displaying to a user, the design displaying to the user an image area having a predetermined position and predetermined first and second dimensions in the design and intended to contain an uploaded image,
   in response to a request of a first type of incorporation of an uploaded image into the image area, creating a resized image by automatically resizing the uploaded image such that the resized image retains the aspect ratio of the uploaded image such that one of the dimensions of the resized image is equal to the corresponding dimension of the area and the other dimension of the resized image is equal to or smaller than the corresponding other dimension of the area, and revising the product design by automatically incorporating the resized image into the product design such that the resized image appears within the image area,
   in response to a request of a second type of incorporation of an uploaded image into an image area in the design, resizing and cropping the uploaded image to create an image version that is the same size as the image area, and revising the product design by automatically incorporating the image version into the product design such that the image version appears within the area, and
   providing the revised product design for displaying to the user,
   wherein the image area is one of a plurality of image area types and wherein the requested type of incorporation is determined by the type of the image area.

2. The method of claim 1 wherein the image area has at least one associated anchor point for use in positioning the design image within the area.

3. The method of claim 1 further comprising allowing the user to reposition either of the resized image and the reduced version within the image area.

4. A computer-implemented method for incorporating an uploaded image into a product design, the method comprising:
   using one or more computing systems to perform the following steps:
   providing a product design for displaying to a user, the design displaying to the user an image area having a predetermined position and predetermined first and second dimensions in the design and intended to contain an uploaded image,
   if request of a first type of incorporation of an uploaded image into the image area is received, creating a resized image by automatically resizing the uploaded image such that the resized image retains the aspect ratio of the uploaded image, one of the dimensions of the resized image is equal to the corresponding dimension of the area, and the other dimension of the resized image is equal to or smaller than the corresponding other dimension of the area, and revising the product design by automatically incorporating the resized image into the product design such that the resized image appears within the image area,
   if request of a second type of incorporation of an uploaded image into an image area in the design is received; resizing and cropping the uploaded image to create an image version that is the same size as the image area; and revising the product design by automatically incorporating the image version into the product design such that the image version appears within the area,
   providing the revised product design for displaying to the user, and
   wherein the image is one of a plurality of image types and wherein the requested type of incorporation is determined by the image type of the selected image.

5. The method of claim 4 further comprising allowing the user to reposition the resized image at least partially outside the image area.

6. The method of claim 4 further comprising allowing the user to resize and reposition the resized image within the product design.

7. The method of claim 4, further comprising allowing the user to reposition the resized image within the image area.

8. A computer-implemented method for incorporating an uploaded image into a product design, the method comprising:
   using one or more computing systems to perform the following steps:
   providing a product design for displaying to a user, the design displaying to the user an image area having a predetermined position and predetermined first and second dimensions in the design and intended to contain an uploaded image, if request of a first type of incorporation of an uploaded image into the image area in the design is received, creating a resized image by automatically resizing the uploaded image such that the resized image retains the aspect ratio of the uploaded image, one of the dimensions of the resized image is equal to the corresponding dimension of the area, and the other dimension of the resized image is equal to or smaller than the corresponding other dimension of the area, and revising the product design by automatically incorporating the resized image into the product design such that the resized image appears within the area, if request of a second type of incorporation of an uploaded image into an image area in the design is received, resizing and cropping the uploaded image to create an image version that is the same size as the image area, and revising the product design by automatically incorporating the image version into the product design such that the image version appears within the area, providing the revised product design for displaying to the user, wherein the requested type of incorporation is selected by the user at the time of image selection.

9. The method of claim 8 wherein the resizing performed upon receipt of the second type of incorporation is performed automatically such that one of the dimensions of the design image is substantially equal to the corresponding dimension of the area and the other dimension of the design image is equal to or larger than the corresponding other dimension of the area.

10. The method of claim 8 wherein the resizing is performed manually by the user.

11. The method of claim 8, further comprising determining if the resolution of the resized image meets a predetermined minimum resolution requirement and, if not, creating a reduced image that retains the aspect ratio of the uploaded image and meets the minimum resolution requirement, and revising the product design by incorporating the reduced image into the image area.

12. The method of claim 11 further comprising allowing the user to reposition either of the resized image and the reduced image at least partially outside the image area.

13. The method of claim 8, further comprising allowing the user to reposition the resized image within the image area.

14. The method of claim 8 hither comprising allowing the user to perform at least one of repositioning the resized image within the image area of the first type and repositioning the image version within the image area of the second type.

15. The method of claim 8 further comprising allowing the user to perform at least one of repositioning the resized image at least partially outside the image area of the first type and repositioning the image version at least partially outside the image area of the second type.

16. The method of claim 8 further comprising allowing the user to resize and reposition either of the resized image and image version anywhere within the product design.

17. A computer-implemented product design method comprising:
using one or more computing systems to perform the following steps:
providing a product design for displaying to a used, the design containing and displaying to the user at least one image area of a first type and at least one image area of a second type, each image area having a predetermined position and predetermined first and second dimensions in the design and intended to contain an uploaded image if the user requests incorporation of an uploaded image into an image area of the first type, creating a resized image by automatically resizing the uploaded image such that the resized image retains the aspect ratio of the uploaded image, one of the dimensions of the resized image is equal to the corresponding dimension of the image area of the first type, and the other dimension of the resized image is equal to or smaller than the corresponding other dimension of the image area of the first type, and revising the product design by automatically incorporating the resized image into the product design such that the resized image is positioned within the image area of the first type, if the user requests incorporation of an uploaded image into an image area of the second type, resizing and cropping the uploaded image to create an image version that is the same size as the image area of the second type, and revising the product design by automatically incorporating the image version into the product design such that the image version is positioned within the image area of the second type, and providing the revised product design for displaying to the user wherein the image area is one of a plurality of image area types and wherein the requested type of incorporation is determined by the type of the image area.

18. The method of claim 17 further comprising allowing the user to perform at least one of repositioning the resized image within the image area of the first type and repositioning the image version within the image area of the second type.

19. The method of claim 17 further comprising allowing the user to perform at least one of repositioning the resized image at least partially outside the image area of the first type and repositioning the image version at least partially outside the image area of the second type.

20. The method of claim 17 further comprising allowing the user to resize and reposition either of the resized image and image version anywhere within the product design.

* * * * *